(12) United States Patent
Sundstrom et al.

(10) Patent No.: US 8,472,446 B2
(45) Date of Patent: Jun. 25, 2013

(54) METHOD FOR DATA PACKET CLASSIFICATION IN A DATA COMMUNICATIONS NETWORK

(75) Inventors: Mikael Sundstrom, Lulea (SE); Josefine Ahl, Lulea (SE)

(73) Assignee: Oricane AB, Lulea (SE)

( * ) Notice: Subject to any disclaimer, the term of this patent is extended or adjusted under 35 U.S.C. 154(b) by 148 days.

(21) Appl. No.: 12/989,526

(22) PCT Filed: May 25, 2009

(86) PCT No.: PCT/SE2009/050593
§ 371 (c)(1),
(2), (4) Date: Oct. 25, 2010

(87) PCT Pub. No.: WO2009/145712
PCT Pub. Date: Dec. 3, 2009

(65) Prior Publication Data
US 2011/0044341 A1    Feb. 24, 2011

(30) Foreign Application Priority Data
May 26, 2008  (SE) ...................................... 0801231

(51) Int. Cl.
*H04L 12/28*    (2006.01)
*H04L 12/56*    (2006.01)

(52) U.S. Cl.
USPC ........................................................ 370/392

(58) Field of Classification Search
None
See application file for complete search history.

(56) References Cited

U.S. PATENT DOCUMENTS 7,424,489 B1 *  9/2008  Duffield et al. ........................ 1/1
7,693,149 B2 *  4/2010  Cathey et al. .................. 370/392

(Continued)

FOREIGN PATENT DOCUMENTS

WO    WO 01/59702    *  8/2001
WO    WO 2008/054323    *  5/2008

OTHER PUBLICATIONS

Aguilar-Arevalo, Alexis, et al., "A look inside the particle identification of MiniBooNE", [retrieved online], <http://www-boone.fnal.gov/slides-talks/other-talk/kendallm/middle_DOEreview2006.pdf>, May 16, 2006.

(Continued)

*Primary Examiner* — Ayaz Sheikh
*Assistant Examiner* — Blanche Wong
(74) *Attorney, Agent, or Firm* — Renner, Otto, Boisselle & Sklar, LLP

(57) ABSTRACT

The present invention pertains to a method for performing specific data forwarding actions depending on the nature of data traffic comprising data packets, which method comprises the steps of:—receiving incoming data traffic of a specific nature, belonging to at least a specific class among a number of pre-defined classes, step 201—classifying the data traffic by determining the nature of the data traffic, provided by a process of inspecting values of a plurality of selected header field(s) of an address space of a data packet, said process providing an input key, step 202, and comprising the step of compressing the rules in the classifier to a list of compressed rules such that the number of bits involved in classification is reduced, step 203, further selecting a first matching class from an ordered list of n rules that identify each class, wherein each rule comprises D fields, step 204 and a preprocessing algorithm for building a decision tree based on the structure of the classifier, said preprocessing algorithm including cutting such that one cut in each dimension is performed, step 205.

8 Claims, 11 Drawing Sheets

U.S. PATENT DOCUMENTS

| | | | |
|---|---|---|---|
| 2001/0053150 A1* | 12/2001 | Clear et al. | 370/392 |
| 2002/0085560 A1 | 7/2002 | Cathey et al. | |
| 2003/0123456 A1* | 7/2003 | Denz et al. | 370/400 |
| 2005/0018615 A1 | 1/2005 | Itoh et al. | |
| 2006/0262789 A1 | 11/2006 | Peleg et al. | |
| 2008/0112415 A1* | 5/2008 | Sobaje | 370/392 |

OTHER PUBLICATIONS

International Search Report from corresponding Application No. PCT/SE09/50593.

* cited by examiner

| Rule | DA | SA | DP | SP | PR | Flow |
|---|---|---|---|---|---|---|
| Rule | 0* | 1* | 17 | 17 | UDP | A |
| Rule | 0* | 10* | * | 100 | TCP | B |
| Rule | 0* | 01* | * | 80 | TCP | C |
| Rule | 0* | 1* | 17 | 44 | UDP | D |
| Rule | 0* | 10* | * | 80 | TCP | E |
| Rule | 10* | 1* | 17 | 17 | UDP | F |

| Rule | Address | Port |
|------|---------|------|
| $R_1$ | 1010 | 2:2 |
| $R_2$ | 1100 | 5:5 |
| $R_3$ | 0101 | 8:8 |
| $R_4$ | * | 6:6 |
| $R_5$ | 111* | 0:15 |
| $R_6$ | 001* | 9:15 |
| $R_7$ | 00* | 0:4 |
| $R_8$ | 0* | 0:3 |
| $R_9$ | 0110 | 0:15 |
| $R_{10}$ | 1* | 7:15 |
| $R_{11}$ | 0* | 11:11 |

| Rule | Field$_1$ | Field$_2$ |
|------|-----------|-----------|
| R$_1$ | [1:1] | * |
| R$_2$ | [2:2] | * |

METHOD FOR DATA PACKET CLASSIFICATION IN A DATA COMMUNICATIONS NETWORK

TECHNICAL FIELD

The present invention relates to a method for data packet classification in a data communications network.

BACKGROUND

A public data communications network such as the Internet is formed of a plurality of networks connected to each other, wherein each of the constituent networks maintains its identity. Each network supports communication among devices connected to the networks, and the networks in their turn are connected by routers. Thus, the Internet can be considered to comprise a mass of routers interconnected by links. Data packets are transmitted over links from one router to the next one on their ways towards the final destinations. In each router a forwarding decision is performed on incoming packets to determine the packets next-hop router.

A data packet consists of a so-called "header" together with the piece of data. The header consists of a number of fields, where each field contains information including where the packet comes from and where it should be sent.

When the packets travel on the Internet they are sorted into different flows according to one or several fields in the headers. The header fields used to sort a packet into the right flow are referred to as the "input key".

The routers use the input key to search for the corresponding flow that the packet belongs to. The search is done in a table called a "classifier". The classifier consists of a list of so-called "rules". Each rule consists of D fields and represents a flow. A packet matches a rule if the header fields in the input key matches the corresponding fields in the rule.

FIG. 1B illustrates a typical classifier with six rules with five fields each and each rule has a flow associated with it. The first field in the classifier is named the destination address (DA), the second field is named the source address (SA), the third field is named the destination port (DP), the fourth field is named the source port (SP) and the fifth field is named the protocol (PR). The first and the second fields are represented by prefixes, the third and fourth fields are represented by numbers and the fifth field is represented by a protocol number.

To summarize, specific data forwarding and/or processing actions depending on the nature of the data traffic, such as blocking data traffic, is provided by classification of incoming data, such as packet classification or multi-field classification. This is provided by a process of inspecting values of selected header fields of a data packet and selecting a first matching rule. The selection is provided by selecting (or finding) from a list of rules or classes the first rule that matches a packet. In principle, each rule consists of D intervals where D is the number of header fields in the packet (or the potential number of header fields of interest). A packet is said to match a rule when the value of each header field of the packet lies within the corresponding interval in the rule. That is, the values contained in all header fields of the packet must match their corresponding interval in the rule.

Thus, to be able to determine to which flow each packet belongs the header fields of the packets are inspected and compared to the list of rules that identify each flow.

This is in the following referred to the "packet classification problem", which is a problem to be solved. The packet classification problem is to determine the first matching rule for each incoming packet at a router.

There are many algorithms solving the packet classification problem and these algorithms can typically be broken down into four types: exhaustive search, decision tree, decomposition and "Tuple space".

Exhaustive Search

The two most common approaches in exhaustive search are linear search and parallel search. Linear search checks every rule in the classifier until a match is found. Parallel search divides the classifier into subsets containing one rule each and then the subsets are searched in parallel. The parallel search can be done using Ternary Content Addressable Memory (TCAM) where one processor is assigned to each rule.

Decision Tree

The classifier is analyzed in order to make a number of cuts and then a decision tree is constructed from the cuts. An input key is constructed from the header fields of the packet and the decision tree is traversed until a leaf is found.

Decomposition

The multiple field searches are decomposed into instances of single field searches. Independent searches on each packet field are made and the results are combined in the end.

Tuple Space

The classifier is partitioned according to the number of specified bits in the rules. This approach is based on the assumption that the intervals constituting the rules are represented by prefixes. The partitions or a subset of the partitions are probed using exact match searches.

SUMMARY OF THE INVENTION

The present invention describes an inventive algorithm that solves the packet classification problem based on cutting and constructing a decision tree from the cuts. The algorithm requires $O(\log(n))$ lookup time and $\Omega(n^D)$ storage in the worst case.

According to a first embodiment of the present invention, this is provided by a method for performing specific data forwarding actions depending on the nature of data traffic comprising data packets. The method comprises the steps of:
  receiving incoming data traffic of a specific nature, belonging to at least a specific class among a number of predefined classes,
  classifying the data traffic by determining the nature of the data traffic, provided by a process of inspecting values of one or more selected header field(s) of an address space of a data packet and selecting a first matching class from an ordered list of classes by means of an classifier. The classifier is analyzed in order to make a number of cuts and then a decision tree is constructed from the cuts. The cuts are restricted to one cut in each dimension. To search, an input key is constructed from the header fields of the packet and the decision tree is traversed until a leaf is found.

According to a second embodiment of the present invention, the cuts are performed independently of each other one time in each dimension.

According to a third embodiment of the present invention, the method further comprises the step of counting interval starting points in the dimension which is cut.

According to a fourth embodiment of the present invention, the cut is performed at an interval starting point.

According to a fifth embodiment of the present invention, the cutting is performed recursively until there is only one rule in each sub-region.

According to a sixth embodiment of the present invention, the decision tree is built breadth first.

According to a seventh embodiment of the present invention, a decision tree small enough to be stored in a single memory block, meaning a block of memory, i.e. a cache line or a disk block, that is accessed in unit time, is built depth first in a separate memory block allocated for that decision tree.

According to an eight embodiment of the present invention, another possible way to decide where to place the cut is to analyze the rule list and measure its hardness with some cost function. Hardness here means how difficult a list of rules is to represent compared to another list of rules. In this way it is possible to decide whether one partition is better than another, or stated in another way, if node X is better than node Y. The length of the rule list can be one example of a cost function. It might be possible to get an even better cost function.

According to a ninth embodiment of the present invention, the sub-regions generated by the cuts can be analyzed in order to reduce the number of pointers and the amount of storage required. The sub-regions can also be analyzed in order to see if no more cuts should be done, meaning that a linear search is done on the rules in a sub-region instead. The sub-regions generated can always be merged together with each other as long as the relative order between the rules is not destroyed. An analyzer or a cost function can be used to decide whether sub-regions should be merged together or not, or whether no more cuts should be placed in a sub-region. For example, sub-regions can contain a number of rules that are the same and if these sub-regions are merged together, duplicated rules are removed and one pointer is stored for these merged sub-regions. Another example is a sub-region that have a small number of rules in it, in that case it can be better not to cut further, leaving the rules together and perform a linear search on the rules in that sub-region instead. For an example on how to analyze the sub-regions consider the fictive node with sub-regions in FIG. 9. The node has eight sub-regions after cutting one time in each dimension. At the beginning there will be eight pointers to the sub-regions. If the rule lists in each sub-region are analyzed, the number of pointers can be reduced, thus reducing the storage. In (1) in FIG. 9 there are three sub-regions that all contains the rule A and these sub-regions can be merged together to one sub-region that only requires one pointer. In that case there will only be one instance of rule A, leading to a reduction of the amount of storage. After merging the rule lists together the recursive cutting will continue on the new sub-regions. In (2) the recursive cutting continues directly. In (3) the first two rule lists are the same and the third rule list only contains one rule so the sub-regions are merged together. In (4) the recursive cutting continues directly.

According to a tenth embodiment of the present invention, the pointer array that each node contains can be compressed by using the Luleå algorithm or the XTC algorithm or yet another algorithm that compresses a pointer array. The main idea of the Luleå algorithm is to identify the redundant pointers and store these implicitly while storing a minimum number of pointers explicitly. This reduces the number of redundant pointers stored and thus reduces storage.

According to another aspect of the present invention a computer program product is provided, having computer program code means to make a computer execute the above method when the program is run on a computer.

It is appreciated that the computer program product is adapted to perform embodiments relating to the above described method, as is apparent from the attached set of dependent system claims.

Additional features and advantages of the present invention are disclosed by the appended dependent claims.

BRIEF DESCRIPTION OF THE DRAWINGS

To further explain the invention embodiments chosen as examples will now be described in greater details with reference to the drawings of which.

DESCRIPTION OF EMBODIMENTS OF THE INVENTION

Figures 1A, 1B:
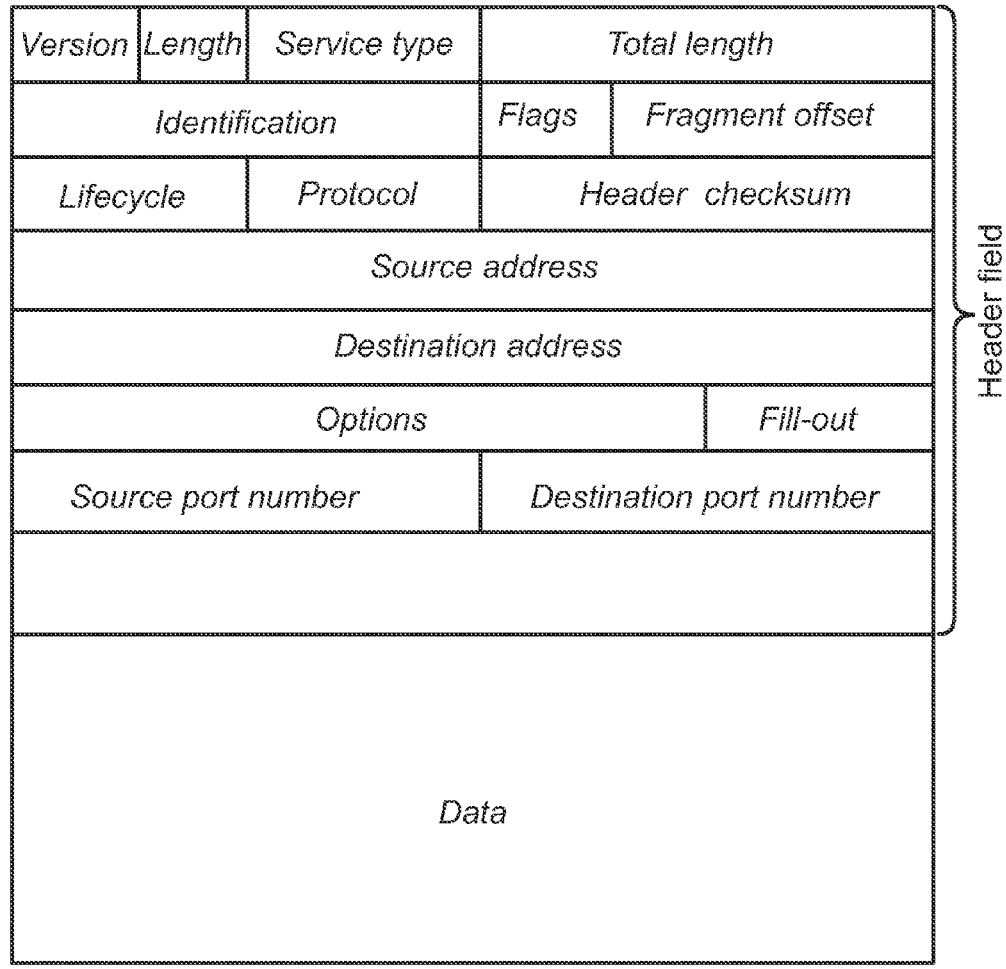
FIG. 1A illustrates a data packet with header fields and data.
FIG. 1B illustrates a classifier with six rules and five fields.
Figure 9:
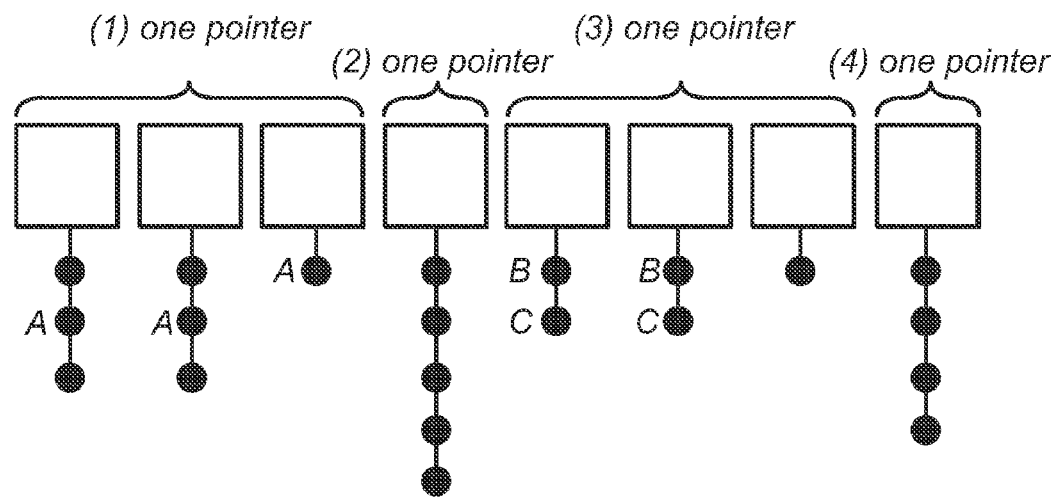
FIG. 9 illustrates a node with rule lists that can be analyzed.

Before a detailed discussion of embodiments of the invention is given, a general data structure solving the packet classification problem forming a basis to the present invention shall be discussed in more detail to ease the understanding of the principles of the invention.

D-dimensional packet classification, or simply packet classification, means to select from a list of rules or classes the first rule that matches a packet. Each rule consists of D intervals corresponding to D header fields in the packet. Let Ri be the ith rule and [xij, yij] the jth interval of rule Ri. Note that, for addresses, intervals are sometimes represented by prefixes and for protocols by single points.

A packet with header fields h1, h2, . . . , hD matches rule Ri if and only if $x_{ij} \leq h_j \leq y_{ij}$ for all j=1, 2, . . . , D.

Typically, there are two dominating approaches to packet classification: Ternary CAMs which is a brute force hardware solution and algorithmic solutions using heuristics to exploit the structure of real life rule lists, or an algorithmic solution, which will be described as follows.

Most existing schemes will be affected in one way or other by replacing 32-bit IPv4 intervals with 128-bit IPv6 intervals in all rules.

Rules consisting of two addresses and two ports will roughly grow from 2·32+2·16=96 bits to 2·128+2·16=288 bits if the intervals are represented by prefixes or from 4·32+ 4·16=192 to 4·128+4·16=576 bits if the intervals are represented as arbitrary ranges. For a hardware solution this translates directly into increased board space and power consumption for a fixed number of rules.

To our best knowledge, there are no benchmarks for algorithmic solutions and IPv6 based rules and it is therefore hard to make an accurate statement about the penalties caused by an IPv6 transition. For a comparison based packet classifier nodes will contain 128 bits values instead of 32 bits values and this will clearly increase the size of the nodes. It will also have considerable effect on the lookup speed if the nodes are carefully sized and aligned to exploit the memory block size b as we do with block trees. For trie based classifiers, the number of levels will most likely increase, resulting in reduced lookup performance, or grow considerably in size.

Clearly, it would be desirable if we could reduce the impact from larger addresses on the D-dimensional classifier. This is provided by means of the present invention, of which an embodiment will now be described, following a detailed introduction to algorithmic solutions. However, the invention is not limited to compression of IPv6 addresses but can also be used to compress IPv4 addresses to reduce the complexity of the classification and increase the performance.

Algorithmic Solutions:

Multi Field Classification (MFC)

MFC, developed and claimed in a pending patent application by the applicant, is an algorithmic solution that solves the packet classification problem in such a way that several fields from the packet header are used as the input key. MFC operates in two steps referred to as "crunching and matchmaking".

The crunching step compresses the original rules R1, R2, ..., Rn in the classifier to a list of crunched rules R01, R02, ..., R0n. The result of this is that the universe for each field is compressed to min(2n+1; 2wi) elements, where wi is the number of bits of the i:th field and n is the number of rules in the classifier. By using this technique, the total number of bits involved in the classification is reduced from $$\Sigma w_i \text{ to } \Sigma \min(w_i, \lceil \log_2(2n+1) \rceil) \text{bits.} \quad (1)$$

The header fields Field1, Field2, ..., FieldD of the input key are also crunched. In the matchmaking step the crunched input key is compared to each rule in the crunched rule list in parallel and then the results from each comparison is combined to determine the first matching rule.

Figure 2A:
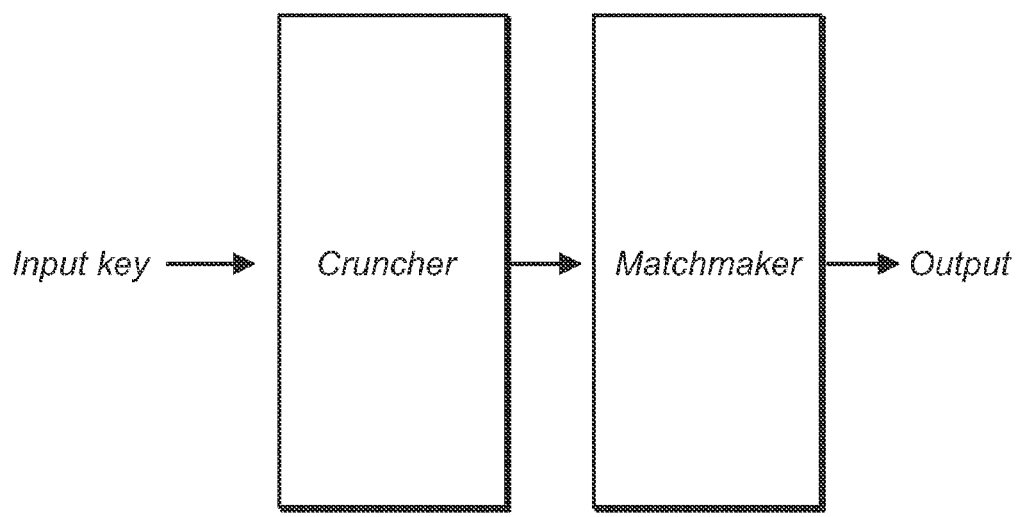
FIG. 2A illustrates a data structure solving the data packet classification problem.
Figure 4:
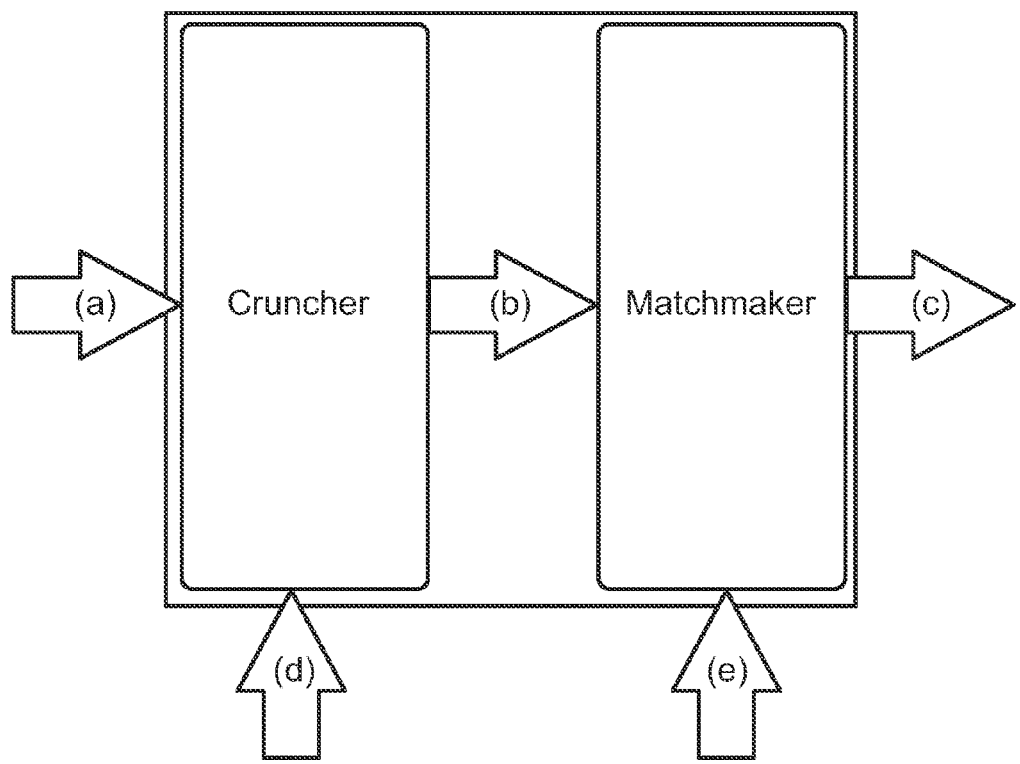
FIG. 4 illustrates a cruncher/matchmaker.

FIG. 2A shows an input key entering the cruncher resulting in a new crunched input key. The crunched input key then enters the matchmaker where it is matched against a crunched rule list and the result is outputted.

The inventive cutting algorithm of the present invention solves the matchmaking step. I The reason for using the term crunching instead of compression is that, even though the key idea is to reduce the effective size of the header fields before multi-dimensional classification, the effective size of some fields may increase as a result of the process. The matchmaking can be performed either in hardware, using a TCAM-like memory which we have briefly described above and will describe in more detail in the context of the present embodiment, or in software using any standard technique for multi-dimensional classification including linear search, cross-producting, quad-trees etc.

Point Location Problem

There is a problem in computational geometry called the "Point Location Problem". It is defined as follows.

Given a query point q in a D-dimensional space, and a set of n D-dimensional non-overlapping regions, find the region that the point q belongs to.

Figure 2B:
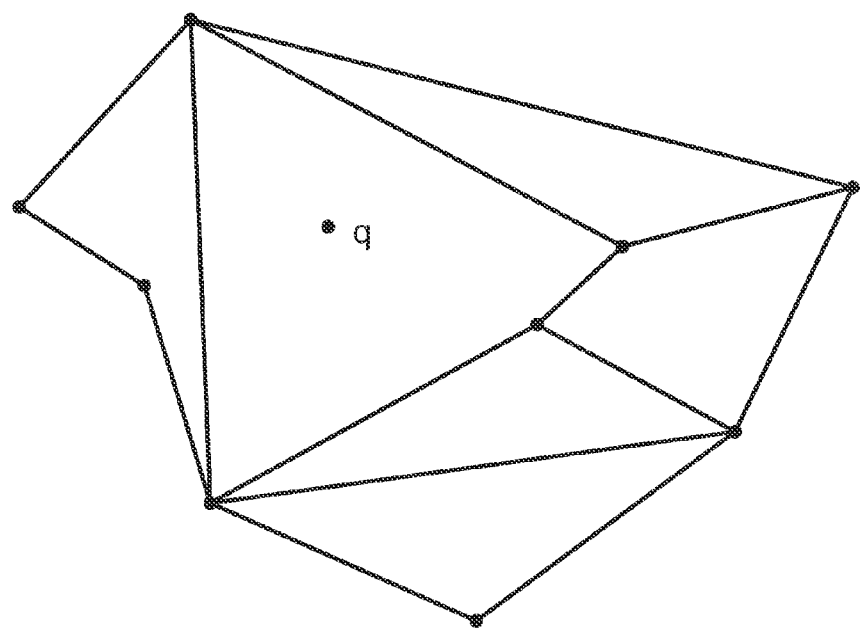
FIG. 2B illustrates an example of the point location problem, namely to find the region that contains the point q.

For example, consider FIG. 2B. It has a query point q and six 2-dimensional regions. The point location problem here is to find the region that contains the point q.

Another example of a point location problem is to find the province on a map that a village belongs to. The village Abisko for example is located at longitude 68°20' north and latitude 18°51' east and it can be found on a map over Sweden by using the scales on the sides of the map. It turns out that Abisko belongs to the province Lapland. In other words, given a map and a query point q specified by its coordinates, the region of the map containing the query point q can be found.

The general packet classification problem, where D>3, can be viewed as a point location problem in multidimensional space. This makes it possible to find worst case complexity bounds of the lookup time and the storage requirements.

The complexity bounds for the point location problem are either $\Omega(\log_2^{D-1}(n))$ lookup time with O(n) storage, or O(log(n)) lookup time with $\Omega(n^D)$ storage.

Embodiments of the present invention will now be described with reference to FIG. 3A, which illustrates the method steps.

Figure 3A:
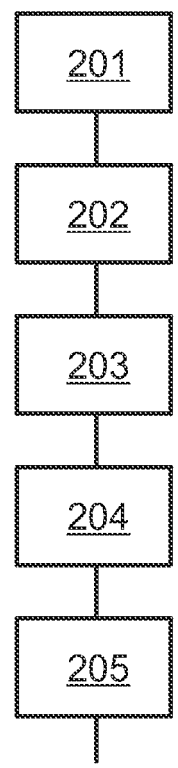
FIG. 3A is a flow-chart showing the method according to an embodiment of the present invention.

FIG. 3A illustrates a method for performing specific data forwarding actions depending on the nature of data traffic comprising data packets. In a first step, step 201, incoming data traffic of a specific nature is received. The data traffic belongs to at least a specific class among a number of predefined classes. In a second step, step 202, the data traffic is classified by determining the nature of the data traffic, provided by a process of inspecting values of a plurality of selected header field(s) of an address space of a data packet. This process provides an input key. In a third, step 203, the rules in the classifier are compressed to a list of compressed rules such that the number of bits involved in classification is reduced. A first matching class from an ordered list of n rules that identify each class is selected, wherein each rule comprises D fields, step 204. A preprocessing algorithm for building a decision tree based on the structure of the classifier, said preprocessing algorithm including cutting such that one cut in each dimension is performed, step 205.

The cuts could be performed independently of each other one time in each dimension, step 205.

The method could further comprise the step of counting interval starting points in the dimension which is cut, step 206.

The cut could be performed at an interval starting point, step 205.

The cutting could be performed recursively until there is only one rule in each sub-region. Typically, the decision tree is built breadth first.

The inventive algorithm takes a geometrical view of the packet classification problem, makes a number of cuts and builds a decision tree. It performs simultaneously cuts, but restricts the cuts to one cut in each dimension. Searching in the decision tree built by the inventive algorithm is done by using the header fields of the incoming packet as the input key and traverse the decision tree until a leaf is found.

The inventive algorithm cuts the region one time in each dimension and the cuts are made independently of each other. To know where to place a cut in the current dimension the interval starting points in that dimension is counted and the cut is placed where the median of the interval staring points is. This means that the cut will distribute the rules as evenly as possible in the sub-regions created.

Figures 3B, 3C:
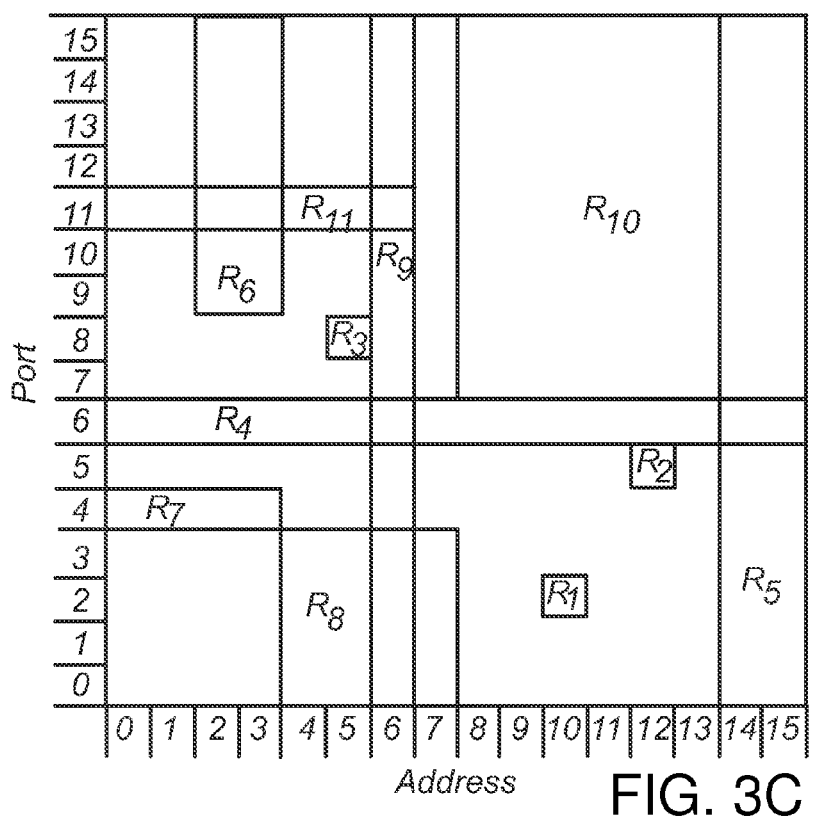
FIG. 3B is a table that illustrates a classifier with eleven rules with two fields each.
FIG. 3C illustrates a geometric representation of the rule list show in FIG. 3B.
Figure 5:
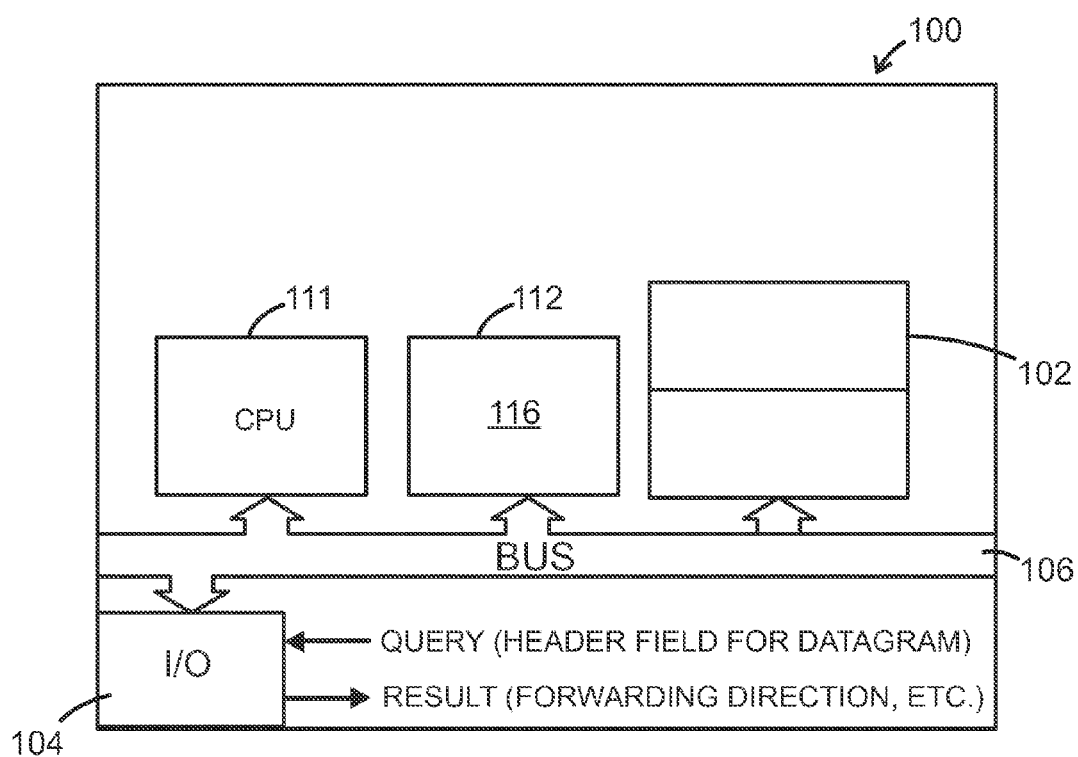
FIG. 5 illustrates a schematic block diagram of a software solution according to an embodiment of the present invention.
Figure 7A:
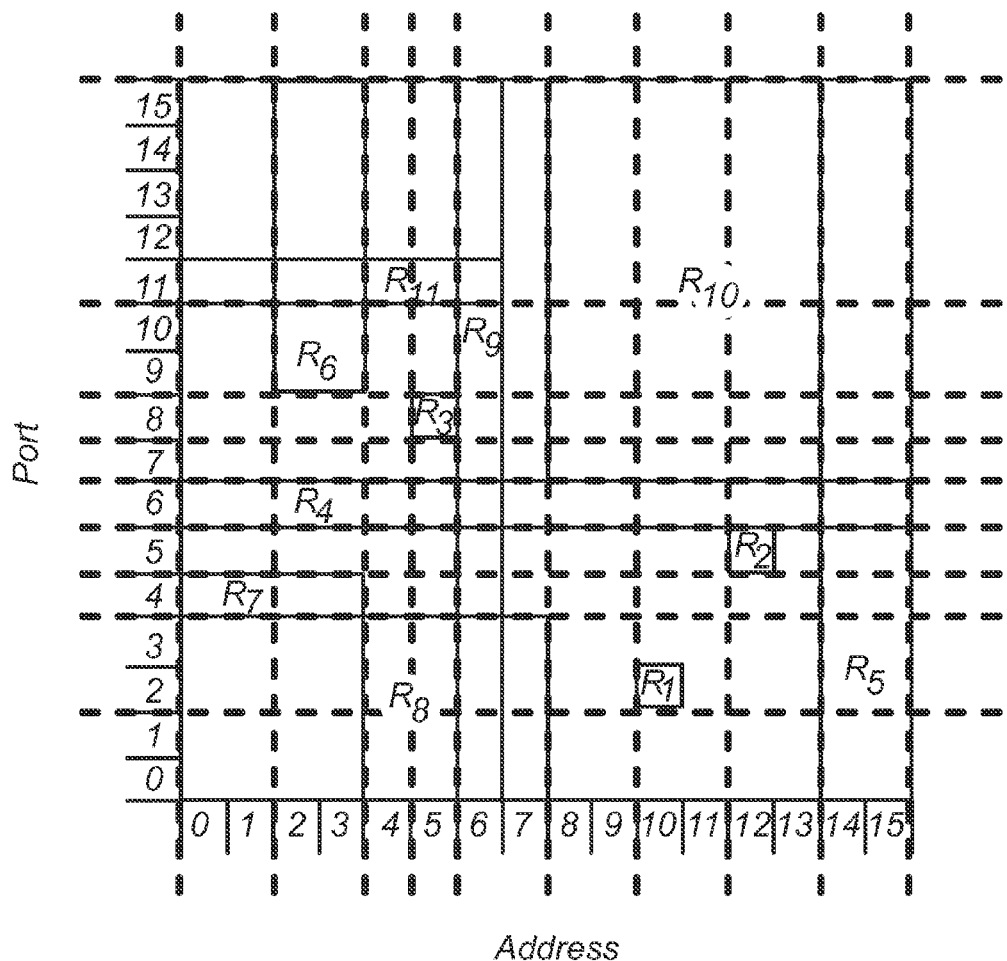
FIG. 7A illustrates interval starting points in the geometric view.

To see how the inventive algorithm works when building the decision tree consider the list of rules in FIG. 3B and its geometrical representation in FIG. 3B. FIG. 3B has eleven interval starting points in the Address-axis as can be seen in FIG. 7A (note that the interval starting point between address value seven and eight must be counted twice since one rule ends there and another rule starts there), meaning that the cut should be placed at interval starting point 11/2=6 if the median is rounded up to nearest integer. The Port-axis also has eleven interval starting points (note that the interval starting point between port value four and five must be counted twice since one rule ends there and another rule starts there), meaning that the cut should be placed at interval starting point 11/2=6.

Figure 7B:
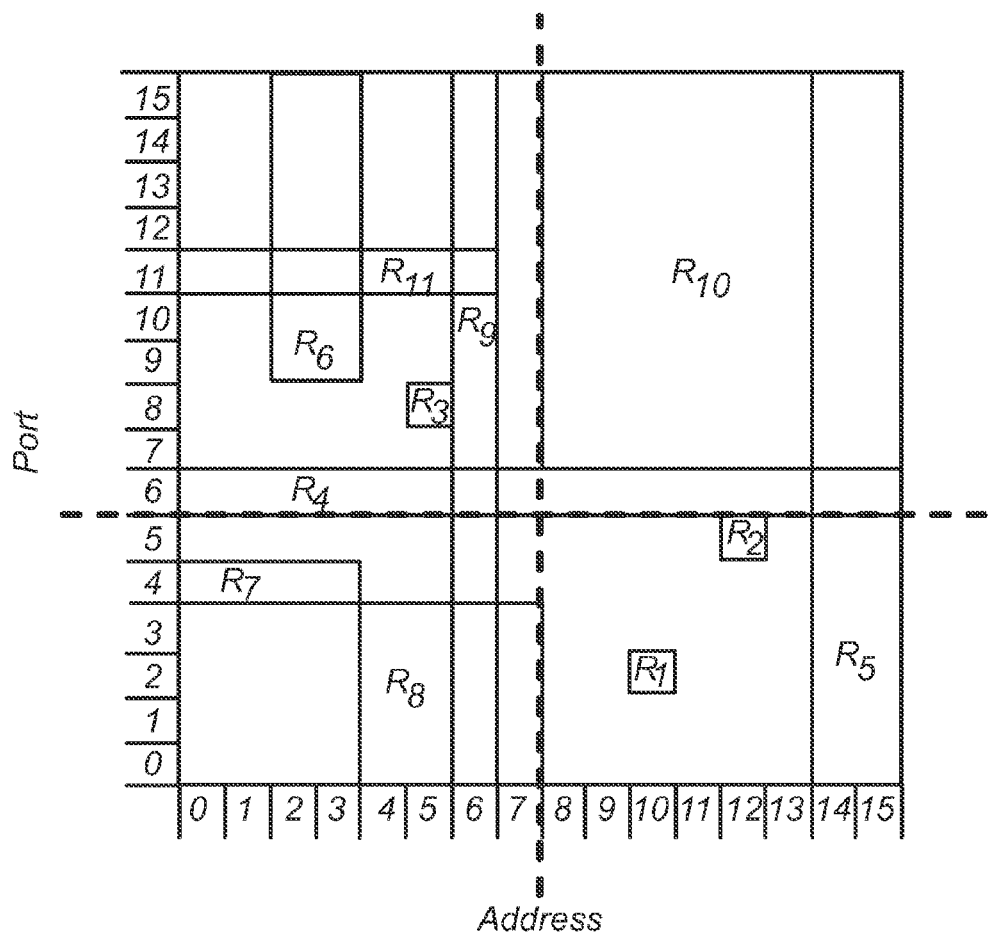
FIG. 7B illustrates sub-regions generated by cutting at the median.

This generates the sub-regions in FIG. 7B. The cutting is then continued recursively on the rule lists in the sub-regions.

Figure 7C:
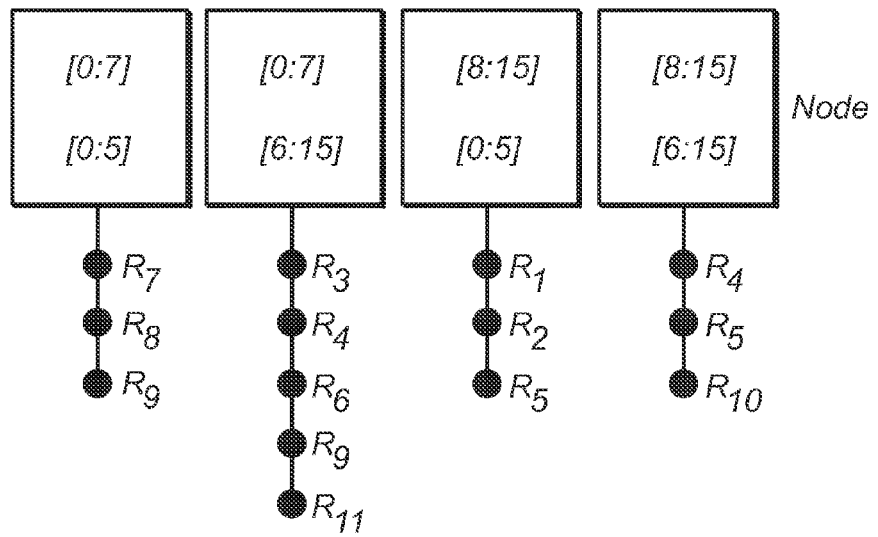
FIG. 7C illustrates node created by making one cut in each dimension as in FIG. 7B.

FIG. 7C represents the node constructed by the cuts in FIG. 7B and the list of rules that each sub-region contains. Each node will have a list of pointers to the sub-regions associated with it.

The inventive algorithm is built up of two different algorithms referred to as the Pre-processing Algorithm and the Search Algorithm.

Pre-Processing Algorithm

The pre-processing algorithm builds the decision tree based on the structure of the classifier. The pre-processing algorithms counts the number of interval starting points and places a cut at the median in each dimension. The cuts are then made recursively in each sub-region generated until there is only one rule in each sub-region. The decision tree will be built breadth first, meaning that all sub-regions generated by the first cuts will be built first, then the sub-regions generated by these cuts will be built and so on. This means that each level of the decision tree will be completely done before the next level is being built.

Search Algorithm

Searching in the decision tree created by the inventive algorithm is performed by using the crunched header fields of the incoming packet as the input key. Each time a packet arrives, the decision tree is traversed to find a leaf that contains only one rule.

Figure 7D:
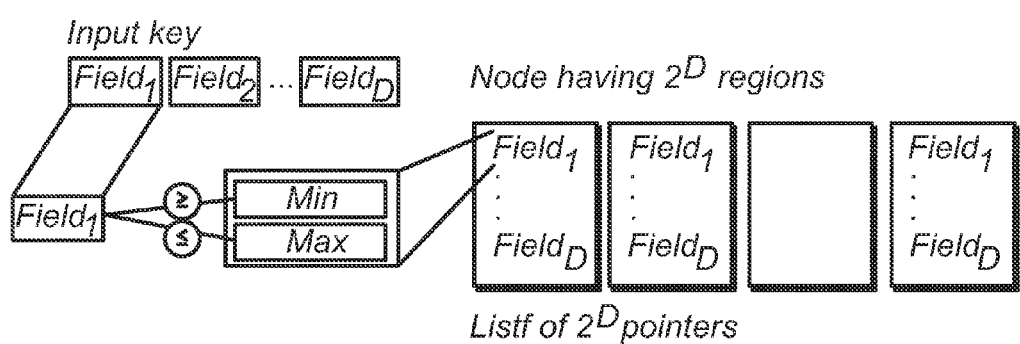
FIG. 7D illustrates input key with D fields, node with $2^D$ regions and list of $2^D$ pointers.

To see how the search algorithm works consider FIG. 7D. The node in the figure consists of $2^D$ sub-regions that are created from the cuts, where D is the number of dimensions or fields. Each region in the node consists of D crunched fields, one for each dimension and each field consists of an interval represented by its minimum value and its maximum value respectively. The input key consists of D crunched fields where each field contains of a value. When searching is done on the input key the fields of the key are compared to the intervals in the node to see where they belong.

Each sub-region in the node can be represented by a D-bit value. This value is used as an index into a list of $2^D$ pointers that points to the corresponding sub-regions.

Typically, the present invention could be implemented by means a processor connected to a fast computer memory with a system bus, in which memory reside computer-executable instructions for execution; the processor being operative to execute the computer-executable instructions to:

providing in a storage, herein typically the main-memory, a datagram forwarding data structure provided for indicating where to forward a datagram in said network, and arranged to receive incoming data traffic of a specific nature, belonging to at least a specific class among a number of pre-defined classes, classify the data traffic by determining the nature of the data traffic, provided by a process of inspecting values of a plurality of selected header field(s) of an address space of a data packet, said process providing an input key, and select a first matching class from an ordered list of n rules that identify each class, wherein each rule comprises D fields, further comprising the step of compressing the rules in the classifier to a list of compressed rules such that the number of bits involved in classification is reduced, and a preprocessing algorithm for building a decision tree based on the structure of the classifier, said preprocessing algorithm including cutting such that one cut in each dimension is performed.

Typically, the analysis of the original list of rules and the compression of the list of rules, as well as the definition of each single field classifier is provided by means of software, but the lookup could be provided by means of hard-ware, for instance by means of pipelining for improved performance. If the lookup is provided by means of software, it is possible to use any kind of legacy multi-dimensional classifier to provide matching of the compressed list.

According to an alternative embodiment of the present invention, there is provided a method, wherein two multi-dimensional classifiers are used where one is customized for basic IPv4 rules and the other for basic IPv6 rules.

The original idea was to use the address space compression scheme to map IPv6 addresses onto IPv4 addresses. Unless $2n+1>2^32$, which we consider unlikely since it would correspond to having more than 2147483647 rules, our goal can easily be achieved. However, for more moderate rule lists, say 1 million rules, we can compress each IPv6 address onto a 21 bits integer instead of using 128 bits which is a reduction by 83%. Even though this does not reduce the combinatorial complexity of the packet classification problem as such, we believe that it will make things considerably easier for most software based D-dimensional packet classifiers, in particular if for those designed to handle addresses as intervals.

For D-dimensional classifiers that heavily exploit (or rather abuse) the common restriction of expressing address intervals as prefixes in rule lists a slightly different mapping must be used. Srinivasan et al. considered the problem of searching among prefix lengths for port intervals in V. Srinivasan, Subhash Sun, and George Varghese. Packet classification using tuple space search. In SIGCOMM, pages 135-146, 1999. They introduced the concept nesting levels which corresponds to prefix length and is defined as the number of levels in a hierarchy of intervals where each interval is a subset of the parent interval. We can push this further by mapping arbitrary intervals to prefixes where each nesting level adds at most two additional bits to the prefix length. It is straightforward to generate such a mapping and for most real applications we can expect the number of nesting levels to be less than 16 and thus all IPv6 prefixes can be mapped onto IPv4 prefixes.

When considering applications with extreme performance requirements, such as core backbone routers, classification is typically performed using a high performance TCAM chip. For IPv6 5-field multi dimensional classification (MFC-5), 296-bit TCAM cells are required. TCAM bits are extremely expensive, both in terms of implementation cost and power consumption.

Figure 6:
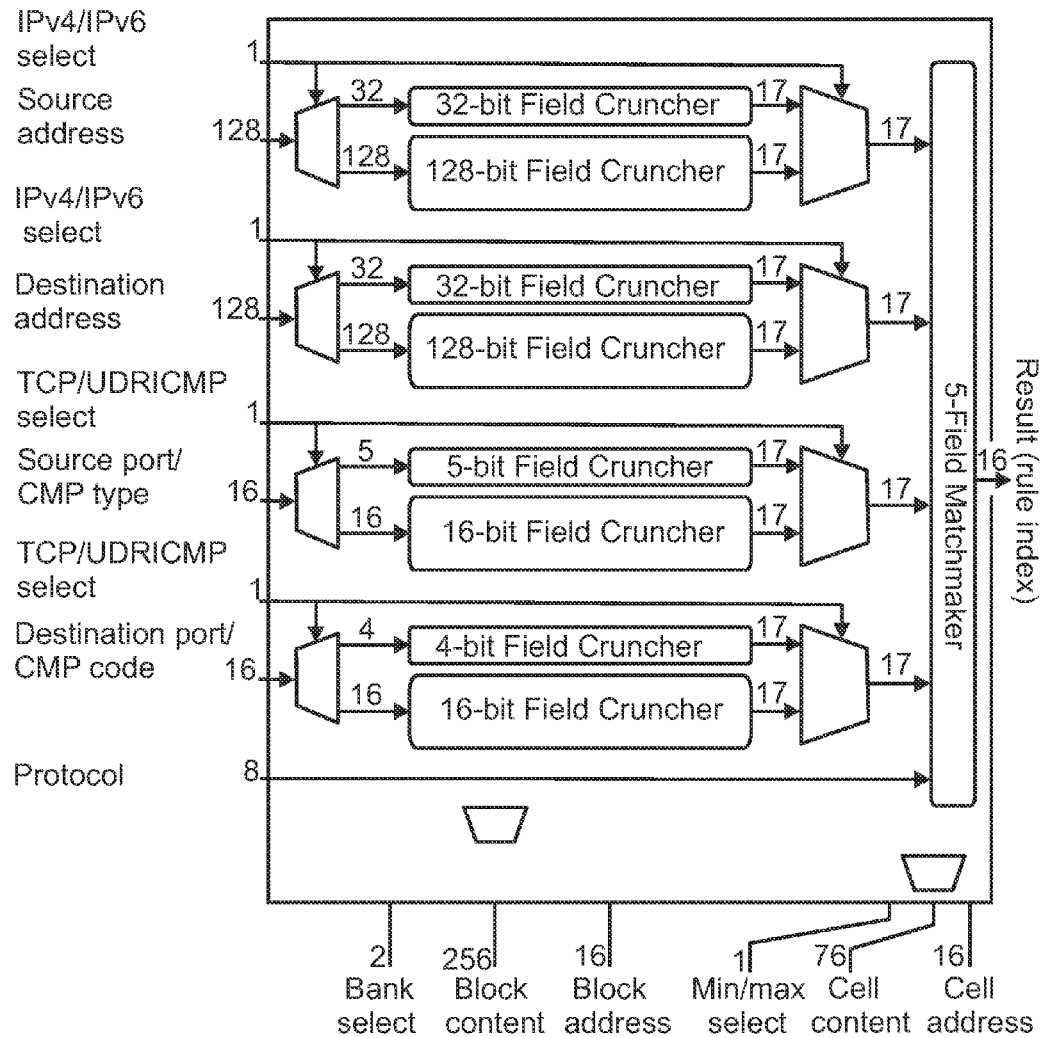
FIG. 6 illustrates a hybrid multi-field classifier consisting of a single hybrid classification block designed for 64 k rules.

The cost for a bit of SRAM memory as used to store our hybrid 1-dimensional classifiers is small compared to the cost of a TCAM bit. We can therefore use two parallel 128-bit classifiers to perform simultaneous address space compression of the source and destination addresses to obtain a reduction from onto 128 bit to 17 bits as shown in FIG. 6. The resulting 5-fields, a total of 74 bits, can then be classified using a TCAM-like memory designed to match intervals instead of arbitrary wild-cards. Since the cost per bit in such a TCAM-like memory is should not be substantially higher than in an ordinary TCAM, the effective reduction of silicon area and power consumption can potentially be as high as 75%.

Cross producting is a commonly used method for combining 1-dimensional classifiers to form a D-dimensional classifier (see V. Srinivasan and George Varghese. Faster IP lookups using controlled prefix expansion. In Proceedings of the 1998 ACM SIGMETRICS joint international conference on Measurement and modelling of computer systems, pages 1-10. ACM Press, 1998). The idea is somewhat similar to our address compression scheme described above but there are a number of important differences which we will now discuss. We start with a list of n rules where each rule defines a D dimensional interval. When using cross producting, a set of D 1-dimensional classifiers are used to map D header fields onto a point in the D-dimensional universe Ucross=$\{0, 1, \ldots, n-1\}^D$. However, the mapping used in cross producting is extremely tight. Therefore, the only possible representation of the original rule list in Ucross is a representation without ties. This forces cross producting to map the original rule list onto a representation where each (mapped) point only can match a single mapped rule. As a result, the mapped representation of the rule list requires $n^D$ storage, in the worst case, when using cross producting. In our scheme, the universe Uhybrid=$\{0, 1, \ldots, 2n\}^D$ is slightly larger. As a result, we can map each original rule list onto a corresponding mapped rule list where the criteria for tie removal of multiple matches is preserved. The resulting mapped rule list consists of the same number of rules as the original rule list.

In a basic scenario, each dimension corresponds to a certain kind of header field which we refer to as the type of the header field. In a basic IPv4 MFC-5 rule, the types of the first and second dimensions are IPv4 source and destination address respectively whereas the types of the third and fourth dimensions are source address and destination address respectively.

Typically, it is assumed that the protocol, which corresponds to the fifth dimension, is either TCP or UDP. Otherwise, the specification of port ranges in the third and fourth dimension would not make any sense. In a basic IPv6 MFC-5 rule the address intervals are IPv6 addresses instead of IPv4 addresses.

One problem with a basic scheme is how to handle rule lists where basic IPv4 and basic IPv6 rules are mixed. If the actual multi-dimensional classification is performed using software (i.e. computer program product running on a computer), using a single multi-dimensional classifier becomes very messy since two address spaces with different sizes needs to be combined. The software will be hard and costly to implement, expensive to maintain and most likely very inefficient. As an alternative approach, two multi-dimensional classifiers can be used where one is customized for basic IPv4 rules and the other for basic IPv6 rules. While this approach may (or may not) be feasible if there are only two types of rules, it does not scale to support the multitude of types of rules that are needed to implement powerful and sophisticated security polices in performance critical network environments. The first concrete situation when this scaling becomes an issue is when we want to support other protocols such as for example ICMP (Internet Control Message Protocol) and ESP (Encapsulating Security Payload) that may follow the IP header. ICMP does not contain port numbers. Instead, there is a 5-bit type and a 4-bit code (even though both are represented as 8-bit fields in the ICMP header. The scaling issues becomes even worse when we want to support rules for IP tunnelling where there may be two or more IPv4/IPv6 headers before the transport header thus yielding an MFC-7 rule, MFC-9 rule etc. In such a situation, the type of the third dimension can be an IPv4 source address, an IPv6 source address, an UDP source port, a TCP source port, or an ICMP type. By allowing even more different kinds of transport protocol rules are supported and/or the levels of tunnelling the situation becomes even worse. In principle, a custom multi-field classifier is required for each possible combination thus causing severe scalability issues both in software and hardware.

In an additional embodiment of the present innovation we will first generalize the previously described address compression technique into a generic crunching step which is then combined with a generic matchmaker to overcome the problems with many possible combinations of rule structures and levels of tunnelling as described above. The reason for using the term crunching instead of compression is that, even though the key idea is to reduce the effective size of the header fields before multi-dimensional classification, the effective size of some fields may increase as a result of the process. The matchmaking can be performed either in hardware, using a TCAM-like memory which we have briefly described above and will describe in more detail in the context of the present embodiment, or in software using any standard technique for multi-dimensional classification including linear search, cross-producting, quad-trees etc.

In this section the inventive algorithm is analyzed in order to see what lookup time and amount of storage it requires in the worst case. The cost for a lookup in n rules will be the number of memory accesses and it is denoted T(n). The amount of storage required for n rules with D dimensions will be the number of memory blocks and it is denoted S(n,D).

Worst Case Lookup Time

The worst case lookup time is the longest lookup time for any input of n rules in D dimensions. For the inventive algorithm, the height of the decision tree corresponds to the worst case lookup time.

If there are n rules, there will be a maximum of I=(2n+1) intervals on each axis, which corresponds to a maximum of (2n+1)+1 interval starting points. In each dimension the interval starting points are cut in half resulting in two sub-regions with at most $$\frac{(2n+1)+1}{2} = n+1$$

interval starting points each at every axis. After cutting in each dimension there will be $2^D$ sub-regions and each sub-region will have at most n+1 interval starting points at each axis. Since 2n+2 interval starting points corresponds to n rules, n+1 interval starting points corresponds to n/2 rules. This means that after cutting is done in each dimension, there can not be more than n/2 rules in each sub-region.

Figures 8A, 8B:
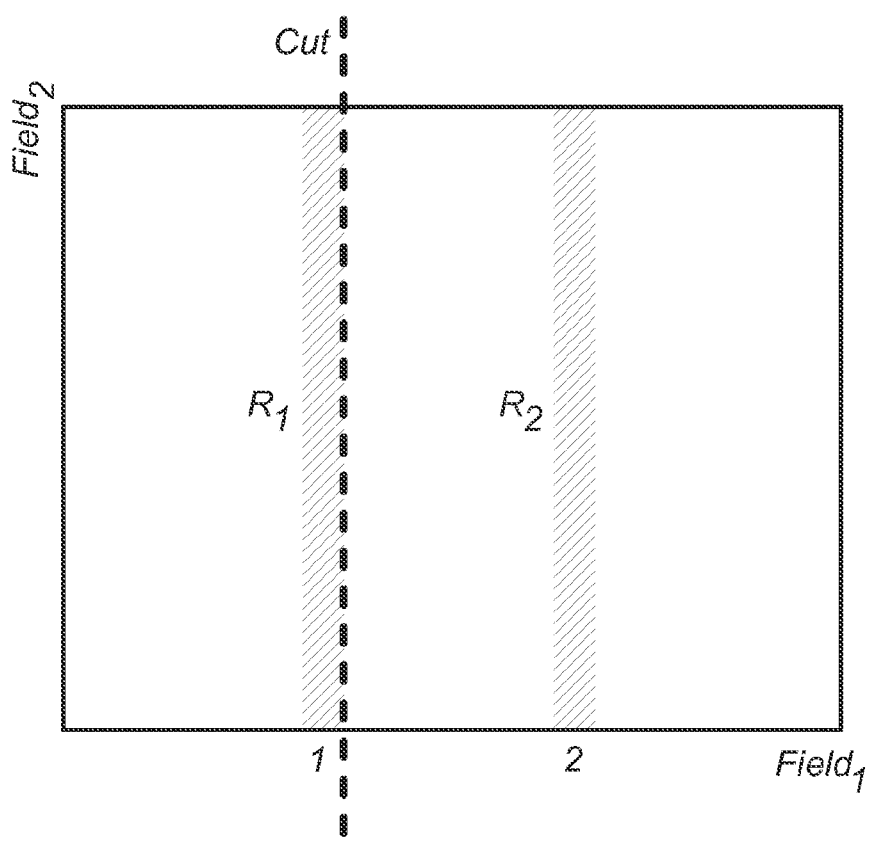
FIG. 8A is a table that illustrates an example rule list with two rules that have two fields each.
FIG. 8B illustrates a geometric representation of the rule list in FIG. 8A where a cut is placed at the median of the interval starting points in Field1.

For example consider the rule list in FIG. 8A and its geometrical representation in FIG. 8B. A cut is placed in the first field and no cut is placed in the second field since the sub-regions generated by the first cut contains only one rule each, i.e., the algorithm halts. In this case there will be n/2 rules in each sub-region and there can not be more than n/2 rules in each sub-region. This corresponds to a lower bound for the inventive algorithm and it is denoted by the Ω-notation.

To summarize, at the beginning there are n rules. After cutting is done in all dimensions there will be $2^D$ sub-regions with at most n/2 rules each. The cutting of the sub-regions continues recursively until there is only one rule in each sub-region. The worst case lookup time T(n) can now be described by $$T(n)=1+T(n/2),$$

since each level requires one memory access. This is a recurrence equation in one variable and it can be solved by substituting $n=2^k$ and using backward substitution, i.e., $$\begin{aligned}T(2^k) &= T(2^{k-1})+1 \quad \text{(substitute } T(2^{k-1})=T(2^{k-2})+1)\\ &= T(2^{k-2})+2 \quad \text{(substitute } T(2^{k-2})=T(2^{k-3})+1)\\ &= T(2^{k-3})+3 \ldots\\ &= \ldots\\ &= T(2^{k-i})+i\\ &= \ldots\\ &= T(2^{k-k})+k\\ &= T(1)+k.\end{aligned}$$

Returning to the original variable $n=2^k$ gives $k=\log_2(n)$ and $$T(n)=T(1)+\log_2(n).$$

Since this corresponds to a lower bound for the inventive algorithm the result is that $$T(n)\in\Omega(\log_2(n)).$$

Worst Case Storage Requirements

In the inventive algorithm a node is created by placing a cut in each dimension and each sub-region generated by the cuts can be represented by a D-bit integer. This means that each node can be stored in one memory block, where a memory block typically is 256-bits, assuming that the list with pointers to sub-regions is not stored in the same memory block.

The amount of storage S(n,D) can be described by $$S(n,D)=1+S(n/2,D)\cdot 2^D.$$

This is a recurrence equation in two variables. The cutting of nodes is done recursively so after the first step there will be at most n/2 rules left for all $2^D$ sub-regions. This corresponds to a lower bound for the storage requirements. Note that the recurrence equation also depends on the constant D, but since D never changes, the recurrence can be written as $$S(n)=1+S(n/2)\cdot 2^D.$$

Solving the recurrence equation can be done by substituting $n=2^k$ and using backward substitution, i.e., $$\begin{aligned}S(2^k) &= 1+2^D\cdot S(2^{k-1})\\ &\quad \text{(substitute } (S(2^{k-1})=1+2^D\cdot S(2^{k-2}))\\ &= 1+2^D\cdot(1+2^D\cdot S(2^{k-2}))\\ &\quad \text{(substitute } (S(2^{k-2})=1+2^D\cdot S(2^{k-3}))\\ &= 1+2^D\cdot(1+2^D\cdot(1+2^D\cdot S(2^{k-3})))\quad \ldots\\ &= 1+2^D+4^D+8^D\cdot S(2^{k-3})\\ &= \ldots\end{aligned}$$

$$\begin{aligned}&= \sum_{j=0}^{i-1}\left((2^D)^j\right)+(2^D)^i\cdot S(2^{k-i})\\ &= \ldots\\ &= \sum_{j=0}^{k-1}\left((2^D)^j\right)+(2^D)^k\cdot S(2^{k-k})\\ &= \sum_{j=0}^{k-1}\left((2^D)^j\right)+(2^D)^k\cdot S(1).\end{aligned}$$

Returning to the original variable $n=2^k$ gives $k=\log_2(n)$ and $$S(n)=\sum_{j=0}^{\log_2(n)-1}\left((2^D)^j\right)+(2^D)^{\log_2(n)}\cdot S(1)=\frac{n^D-1}{2^D-1}+n^D\cdot S(1).$$

This is a lower bound for the storage requirements in the inventive algorithm and it can be written as $$S(n,D)\in\Omega(n^D).$$

Recall that if the point location problem takes $\Omega(n^D)$ amount of storage it will run in O(log(n)) time. This means that the inventive algorithm will take O(log(n)) lookup time in the worst case, which is an upper bound. Since the $\Omega(\log_2(n))$ worst case lower bound match the O(log(n)) worst case upper bound for the lookup time, the inventive algorithm is asymptotically optimal in its class.

We claim:

1. A method for performing specific data forwarding actions for incoming data traffic, the incoming data traffic comprising data packets and each data packet comprising a header and data, which method comprises the steps of:

receiving the incoming data traffic, wherein the incoming data traffic belongs to at least one class from a plurality of pre-defined classes, classifying and transmitting the incoming data traffic by determining the nature of the data traffic, provided by a process of:

providing a classifier for classifying the data traffic, the classifier comprising n data routing rules that respectively represent the plurality of pre-defined classes and each of the data routing rules comprising D fields that are respectively made up of bits representing a respective value, wherein n and D are whole numbers greater than 1, and each of the D fields represents a dimension for a decision tree;

inspecting values of a plurality of selected header fields of an address space of a data packet from the incoming data traffic to generate an input key, wherein each of the selected header fields has a value matching the value of one of the D fields, generating a compressed classifier by compressing the n data routing rules in the classifier into an ordered list of n compressed data routing rules such that a total number of bits associated with the compressed classifier is reduced from the classifier, and the total number of bits collectively represent the plurality of pre-defined classes and the D fields that represent the dimensions for a decision tree, building a decision tree based on the compressed classifier by cutting the compressed classifier with one cut in each dimension, the cuts forming sub-regions of the decision tree and each sub-region containing at least one of the n data routing rules, the built decision tree being a multi-dimensional representation of the pre-defined classes, and transmitting the incoming data traffic in accordance with the at least one class from the plurality of pre-defined classes to which the incoming data traffic belongs, wherein the at least one class is determined by applying the input key to the built decision tree to ascertain the sub-region of the built decision tree to which the incoming data traffic belongs.

2. The method according to claim 1, wherein the cuts are performed independently of each other and one time in each dimension.

3. The method according to claim 1, wherein the building of a decision tree comprises iteratively carrying out a preprocessing algorithm, each iteration having an interval starting point and counting the interval starting points.

4. The method according to claim 1, wherein the decision tree is built breadth first.

5. The method according to claim 1, wherein there is a median in each dimension and each cut is placed at the respective median in each dimension.

6. A method for performing specific data forwarding actions for incoming data traffic, the incoming data traffic comprising data packets and each data packet comprising a header and data, which method comprises the steps of:

receiving the incoming data traffic, wherein the incoming data traffic belongs to at least one class from a plurality of pre-defined classes, classifying and transmitting the incoming data traffic by determining the nature of the data traffic, provided by a process of:

providing a classifier for classifying the data traffic, the classifier comprising n data routing rules that respectively represent the plurality of pre-defined classes and each of the data routing rules comprising D fields that are respectively made up of bits representing a respective value, wherein n and D are whole numbers greater than 1, and each of the D fields represents a dimension for a decision tree;

inspecting values of a plurality of selected header fields of an address space of a data packet from the incoming data traffic to generate an input key, wherein each of the selected header fields has a value matching the value of one of the D fields, generating a compressed classifier by compressing the n data routing rules in the classifier into an ordered list of n compressed data routing rules such that a total number of bits associated with the compressed classifier is reduced from the classifier, and the total number of bits collectively represent the plurality of pre-defined classes and the D fields that represent the dimensions for a decision tree, building a decision tree based on the compressed classifier by cutting the compressed classifier with one cut in each dimension, the cuts forming sub-regions of the decision tree and each sub-region containing at least one of the n data routing rules, the built decision tree being a multi-dimensional representation of the pre-defined classes, and transmitting the incoming data traffic in accordance with the at least one class from the plurality of pre-defined classes to which the incoming data traffic belongs, wherein the at least one class is determined by applying the input key to the built decision tree to ascertain the sub-region of the built decision tree to which the incoming data traffic belongs;

wherein the cuts are performed at an interval starting point; and wherein the cutting is performed recursively until there is only one rule in each sub-region of the decision tree.

7. A method for performing specific data forwarding actions for incoming data traffic, the incoming data traffic comprising data packets and each data packet comprising a header and data, which method comprises the steps of:

receiving the incoming data traffic, wherein the incoming data traffic belongs to at least one class from a plurality of pre-defined classes, classifying and transmitting the incoming data traffic by determining the nature of the data traffic, provided by a process of:

providing a classifier for classifying the data traffic, the classifier comprising n data routing rules that respectively represent the plurality of pre-defined classes and each of the data routing rules comprising D fields that are respectively made up of bits representing a respective value, wherein n and D are whole numbers greater than 1, and each of the D fields represents a dimension for a decision tree;

inspecting values of a plurality of selected header fields of an address space of a data packet from the incoming data traffic to generate an input key, wherein each of the selected header fields has a value matching the value of one of the D fields, generating a compressed classifier by compressing the n data routing rules in the classifier into an ordered list of n compressed data routing rules such that a total number of bits associated with the compressed classifier is reduced from the classifier, and the total number of bits collectively represent the plurality of pre-defined classes and the D fields that represent the dimensions for a decision tree, building a decision tree based on the compressed classifier by cutting the compressed classifier with one cut in each dimension, the cuts forming sub-regions of the decision tree and each sub-region containing at least one of the n data routing rules, the built decision tree being a multi-dimensional representation of the pre-defined classes, and transmitting the incoming data traffic in accordance with the at least one class from the plurality of pre-defined classes to which the incoming data traffic belongs, wherein the at least one class is determined by applying the input key to the built decision tree to ascertain the sub-region of the built decision tree to which the incoming data traffic belongs;

wherein the input key is a compressed version of the selected header fields of the data packet and the applying the input key comprising searching the decision tree by using the input key.

8. A method for performing specific data forwarding actions for incoming data traffic, the incoming data traffic comprising data packets and each data packet comprising a header and data, which method comprises the steps of:

receiving the incoming data traffic, wherein the incoming data traffic belongs to at least one class from a plurality of pre-defined classes, classifying and transmitting the incoming data traffic by determining the nature of the data traffic, provided by a process of:

providing a classifier for classifying the data traffic, the classifier comprising n data routing rules that respectively represent the plurality of pre-defined classes and each of the data routing rules comprising D fields that are respectively made up of bits representing a respective value, wherein n and D are whole numbers greater than 1, and each of the D fields represents a dimension for a decision tree;

inspecting values of a plurality of selected header fields of an address space of a data packet from the incoming data traffic to generate an input key, wherein each of the selected header fields has a value matching the value of one of the D fields, generating a compressed classifier by compressing the n data routing rules in the classifier into an ordered list of n compressed data routing rules such that a total number of bits associated with the compressed classifier is reduced from the classifier, and the total number of bits collectively represent the plurality of pre-defined classes and the D fields that represent the dimensions for a decision tree, building a decision tree based on the compressed classifier by cutting the compressed classifier with one cut in each dimension, the cuts forming sub-regions of the decision tree and each sub-region containing at least one of the n data routing rules, the built decision tree being a multi-dimensional representation of the pre-defined classes, and transmitting the incoming data traffic in accordance with the at least one class from the plurality of pre-defined classes to which the incoming data traffic belongs, wherein the at least one class is determined by applying the input key to the built decision tree to ascertain the sub-region of the built decision tree to which the incoming data traffic belongs;

wherein two multi-dimensional classifiers are used where one is customized for basic IPv4 rules and the other for basic IPv6 rules.

* * * * *